US012397566B1

(12) United States Patent
Milian

(10) Patent No.: US 12,397,566 B1
(45) Date of Patent: Aug. 26, 2025

(54) SYSTEM AND METHOD FOR VISUALIZING ANATOMICAL EDUCATION

(71) Applicant: Eryn Keefe Milian, Palmetto Bay, FL (US)

(72) Inventor: Eryn Keefe Milian, Palmetto Bay, FL (US)

(*) Notice: Subject to any disclaimer, the term of this patent is extended or adjusted under 35 U.S.C. 154(b) by 373 days.

(21) Appl. No.: 17/993,723

(22) Filed: Nov. 23, 2022

Related U.S. Application Data

(60) Provisional application No. 63/283,001, filed on Nov. 24, 2021.

(51) Int. Cl.
*B41J 11/42* (2006.01)
*B41J 3/46* (2006.01)

(52) U.S. Cl.
CPC ................ *B41J 11/42* (2013.01); *B41J 3/46* (2013.01)

(58) Field of Classification Search
CPC ................ B41J 3/46; B41J 11/42; B41J 2/21
See application file for complete search history.

(56) References Cited

U.S. PATENT DOCUMENTS 5,743,899 A * 4/1998 Zinreich ............ A61N 5/1049 606/1
6,207,874 B1 3/2001 Felton et al.
10,922,894 B2 * 2/2021 Sculli ..................... G06T 9/00
2012/0302863 A1 11/2012 O'Neill
2020/0078093 A1 * 3/2020 Bohl .................... G16H 30/40

OTHER PUBLICATIONS

Next Luxury, https://nextluxury.com/mens-style-and-fashion/bone-tattoo-designs-for-men/, Feb. 25, 2020 Date Downloaded.
Weissbrod et al., Rapid Application Temporary Tattoos for Medical Moulage: From Development to Testing and Commercialization.

* cited by examiner

*Primary Examiner* — Thinh H Nguyen
(74) *Attorney, Agent, or Firm* — MALLOY & MALLOY, PL

(57) ABSTRACT

A system and method for visualizing anatomical education. The system for visualizing anatomical education includes an anatomical assembly comprising at least one source of educational information and a printing assembly configured to generate at least one printed sheet. Further, the present invention relates to at least one method for visualizing anatomical education wherein users may utilize the system for visualizing anatomical education and its assemblies therein, the present invention thereby (1) teaching and educating the users about anatomical information pertaining to a wide variety of anatomical components and (2) providing an alternative interactive tool such that the educational strain on the users to resort to rote memorization as a means of learning is lessened. Additionally, the present invention relates to a system and method that is practical, thereby permitting users with an effective means of visualizing anatomical education and learning about anatomical information pertaining to a wide variety of anatomical components.

16 Claims, 13 Drawing Sheets

SYSTEM AND METHOD FOR VISUALIZING ANATOMICAL EDUCATION

CLAIM OF PRIORITY

The present application claims priority under 35 U.S.C. Section 119 to a U.S. Provisional application having Ser. No. 63/283,001 and filed on Nov. 24, 2021, which is incorporated by reference herein in its entirety.

FIELD OF THE INVENTION

The present invention is directed to a system and method for visualizing anatomical education.

DESCRIPTION OF THE RELATED ART

In the realm of anatomy—within the overarching medicinal universe—and particularly the study of anatomy thereof, students and other individuals interested in becoming medical professionals are required to learn, know, and recall information pertaining to minute intricacies of the human body, while the educators of such individuals must be adequately prepared to instill such knowledge in said individuals. From muscles to organs and from bones to blood vessels, anatomical study is rife with distinct, but interconnected, components. As may be understood, the process of learning anatomical information can be a cumbersome and difficult task, and this sentiment is widely shared among medical professionals of all types, including, but not limited to, doctors, nurses, and physical therapists. Typically, the primary process of learning anatomical information comes by way of rote memorization.

Traditionally, individuals who educate others on the study of anatomy and anatomical information primarily rely on theoretical study—books and other educational tools, such as presentations—to teach and visualize anatomical education. As may be understood, books and other such educational tools have the tendency to be boring, and these tools often fail to fully visualize the requisite level of detail needed for the rote memorization of anatomical information required in anatomical study. Indeed, books and other similar media may provide written information, pictures, and/or videos of anatomical components in conjunction with other important bodily information, such as origin and innervation. However, there is little practical application in this realm of theoretical study, and medical schools around the country have reduced their reliance on anatomy as a foundational course in their collective curriculums.

Of course, theoretical study is often accompanied by practical study, such as through the dissection of one or more cadavers. Still, due to the limited amount of time students and other individuals interested in becoming medical professionals may have to dissect a cadaver, practical study is often too limited in scope to provide the full spectrum of educational tools necessary for students and other individuals interested in becoming medical professionals to fully comprehend the extent of the human anatomy. Moreover, the use of cadavers as a tool to study anatomy is diminishing, at least in part due to the increasing costs of such means of education.

One modern alternative to the foregoing means of studying anatomy and anatomical information comes by way of computer software applications, which may visualize anatomical components in an interactive three-dimensional digital medium. However, while these applications provide interactive experiences such that students and other individuals interested in becoming medical professionals may engage with the information therein, they are expensive to develop, and are thus expensive to utilize. Moreover, these computer software applications fail to solve one of the foundational problems with the foregoing theoretical study tools; namely, that medical professionals need to locate anatomical components on actual humans. Because humans can vary in a variety of ways—such as height and weight—it can be difficult for these applications to truly emphasize the varieties possible in the human anatomy.

As such, a system and method are therefore required to provide for an alternative tool to visualize anatomical education. Specifically, there is a need in the art for a system and method designed to provide students and other individuals interested in becoming medical professionals with an alternative tool to studying anatomy and anatomical information, wherein such a system and method (1) teaches and educates users about anatomical information pertaining to a wide variety of anatomical components and (2) provides an alternative interactive tool such that the educational strain on the users to resort to rote memorization as a means of learning is lessened. Additionally, the present invention relates to a system and method that is practical, thereby permitting users with an effective means of visualizing anatomical education and learning about anatomical information pertaining to a wide variety of anatomical components without requiring rote memorization. It is further desired that the present invention be inexpensive and widely accessible-thus allowing for widespread use among students and other individuals interested in becoming medical professionals from all backgrounds.

SUMMARY OF THE INVENTION

In view of the disadvantages that come with using the aforementioned means of studying anatomy and anatomical information (e.g., books, presentations, dissection of one or more cadavers, and computer software applications), the present invention is directed to a system and method which more effectively enables and supports visualization of anatomical education while concurrently lessening the strain of rote memorization on the individual or individuals engaging in the study or teaching of anatomy and anatomical information. The present invention is thus directed to a system and method for visualizing anatomical education. As used herein, the phrase “actual” can refer to any of a variety of terms pertaining to “anatomically accurate” or “real life” or “relating to characteristics of real anatomical components”—and “actual” is described only by way of non-limiting example. Additionally, as used herein, the phrase “anatomical relation” can refer to any of a variety of terms pertaining to the connection between the location of the anatomical component design and the actual location of the anatomical component—and “anatomical relation” is described only by way of non-limiting example. Furthermore, as used herein, the phrases “visualize” and “visualizing” can refer to any of a variety of terms, including but not limited to, “looking at” or “envisaging” or “transferring onto the skin of an individual”—and “visualize” and “visualizing” are described only by way of non-limiting example.

In more specific terms, the system for visualizing anatomical education may comprise an anatomical assembly which may further comprise at least one source of educational information—the at least one source of educational information configured to contain at least one anatomical component design. By way of non-limiting example, the at least one anatomical component design may be hand-drawn, graphically designed, or three-dimensionally modeled. By way of additional non-limiting example, the at least one anatomical component design is a design of at least one anatomical component. In such an example, the at least one anatomical component may be a single component—such as a single muscle—or a plurality of components that may or may not be interconnected—such as an amalgamation of muscles. Additionally, in at least some embodiments, the at least one source of educational information is a physical device, such as an external hard drive, SD card, USB flash drive, or other device with processing power and/or a memory component. In at least some other embodiments, the at least one source of educational information is a digital repository, such as a cloud-based storage server or other information system that ingests, stores, manages, preserves, and provides access to the data stored therein.

The system for visualizing anatomical education may also comprise a printing assembly, with the anatomical assembly communicably configured in connection with the printing assembly. In at least one embodiment, the printing assembly is communicably configured in connection with the anatomical assembly via a connecting wire. In at least one other embodiment, the printing assembly is communicably configured in connection with the anatomical assembly via a wireless technology, such as Wi-Fi or Bluetooth technology. By way of non-limiting example, the printing assembly may comprise at least one printer. By way of additional non-limiting example, the printing assembly may comprise at least two printers. In such an embodiment, the at least two printers are communicably configured in connection with one another. Furthermore, by way of non-limiting example, the printing assembly may comprise at least one printer operable with at least one printable sheet. In at least some embodiments wherein the printing assembly comprises at least one printable sheet, the at least one printable sheet may comprise a transferable print media structurally configured to transfer the at least one anatomical component design onto a visualization surface. In such embodiments, and by way of non-limiting example, the at least one printable sheet comprises at least one water slide paper or silhouette paper. By way of non-limiting example, the at least one printable sheet may be transparent or translucent in nature. By way of another non-limiting example, in such embodiments wherein the at least one printable sheet comprises a transferable print media, the at least one printable sheet may be configured to transfer the at least one anatomical component design onto a visualization surface, such as human skin, akin to a removable tattoo (e.g., a user may transfer the at least one anatomical component design onto the user's own skin or onto the skin of another). In such embodiments, and by way of non-limiting example, the system may also include at least one material configured to remove the at least one anatomical component design from the visualization surface, such as at least one removal wipe. Moreover, and by way of additional non-limiting example, the at least one anatomical component design may comprise at least one scannable area, the at least one scannable area configured such that the scanning of the at least one scannable area provides at least one educational resource pertaining to the at least one anatomical component. In such embodiments, it may be understood that visualization of the anatomical component design may thus take on an interactive medium, wherein a user is able to visualize the anatomical component design in the context of the user's body, without the need for a cadaver. Furthermore, in at least one of such embodiments, the at least one printable sheet may be configured to transfer the at least one anatomical component design onto a visualization surface by way of layering at least one anatomical component design layer on top of or in anatomical relation to at least one other anatomical component design layer, such that the removal of the outermost anatomical component design layer may serve to further visualize anatomical information relating to the at least one anatomical component. By way of additional non-limiting example, the at least one anatomical component design layer is transparent or translucent in nature such that at least one other anatomical component design layer is visible when layered.

Moreover, in some embodiments of the present invention, the printing assembly is operatively configured to print the at least one anatomical component design in at least one size. In at least one other embodiment of the present invention, the printing assembly is operatively configured to print the at least one anatomical component design in sizes corresponding to the actual sizes of the at least one anatomical component. In at least some other embodiments, the printing assembly is operatively configured to print the at least one anatomical component design in a plurality of printed segments. In such embodiments, the plurality of printed segments may be structurally configured to collectively form a common anatomical component design. In at least some other embodiments, the printing assembly is operatively configured to generate a visual representation of the at least one anatomical component design on a transferable print media, the visual representation having a predetermined size. In such embodiments, the transferable print media is configured to transfer the at least one anatomical component design onto a visualization surface.

The attendant method of the present invention includes the visualization of anatomical education. Further, one or more embodiments of the present invention include a method comprising the implementing of an anatomical assembly having at least one source of educational information, the integrating of a printing assembly with the anatomical assembly, the generating of at least one printed sheet having at least one anatomical component design, and the visualizing of the at least one anatomical component design in the context of a body of an individual. Involved in the method of such embodiments of the present invention is the retrieving of the at least one printed sheet having at least one anatomical component design. In some embodiments of the present invention, the method of the present invention includes the generating of the at least one printed sheet having at least one anatomical component design in at least one size. In other embodiments of the present invention, the method of the present invention includes the generating of at the least one printed sheet having at least one anatomical component design in sizes corresponding to the actual sizes of at least one anatomical component. In additional embodiments still, the method of the present invention includes the transferring of the at least one anatomical component design onto the skin of an individual. In such embodiments, the at least one printed sheet comprises a transferable print media. Furthermore, in at least one other embodiment, the method of the present invention includes the transferring of the at least one anatomical component design onto a visualization surface, such as the skin of an individual, by way of layering at least one anatomical component design layer on top of or in anatomical relation to at least one other anatomical component design layer, such that the removal of the outermost anatomical component design layer may serve to further visualize anatomical information relating to the at least one anatomical component.

By way of non-limiting example, the method of the present invention in one or more preferred embodiments further includes the generating of the at least one printed sheet having at least one anatomical component design in a plurality of printed segments, the retrieving of the plurality of printed segments, the forming of a common anatomical component design, and the visualizing of the common anatomical component design. In at least one other embodiment, the method of the present invention further includes the transferring of the common anatomical component design from the plurality of printed segments onto the skin of an individual.

Furthermore, and by way of non-limiting example, the method for visualizing anatomical education may comprise the implementing of an anatomical assembly having at least one source of educational information; the integrating of a printing assembly with the anatomical assembly; the integrating of a virtual reality assembly with the printing assembly and the anatomical assembly, the virtual reality assembly configured to visualize the at least one anatomical component design; the generating of at least one printed sheet having at least one anatomical component design, and the visualizing of the at least one anatomical component design. Involved in the method of such embodiments of the present invention is the retrieving of the at least one printed sheet having at least one anatomical component design.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
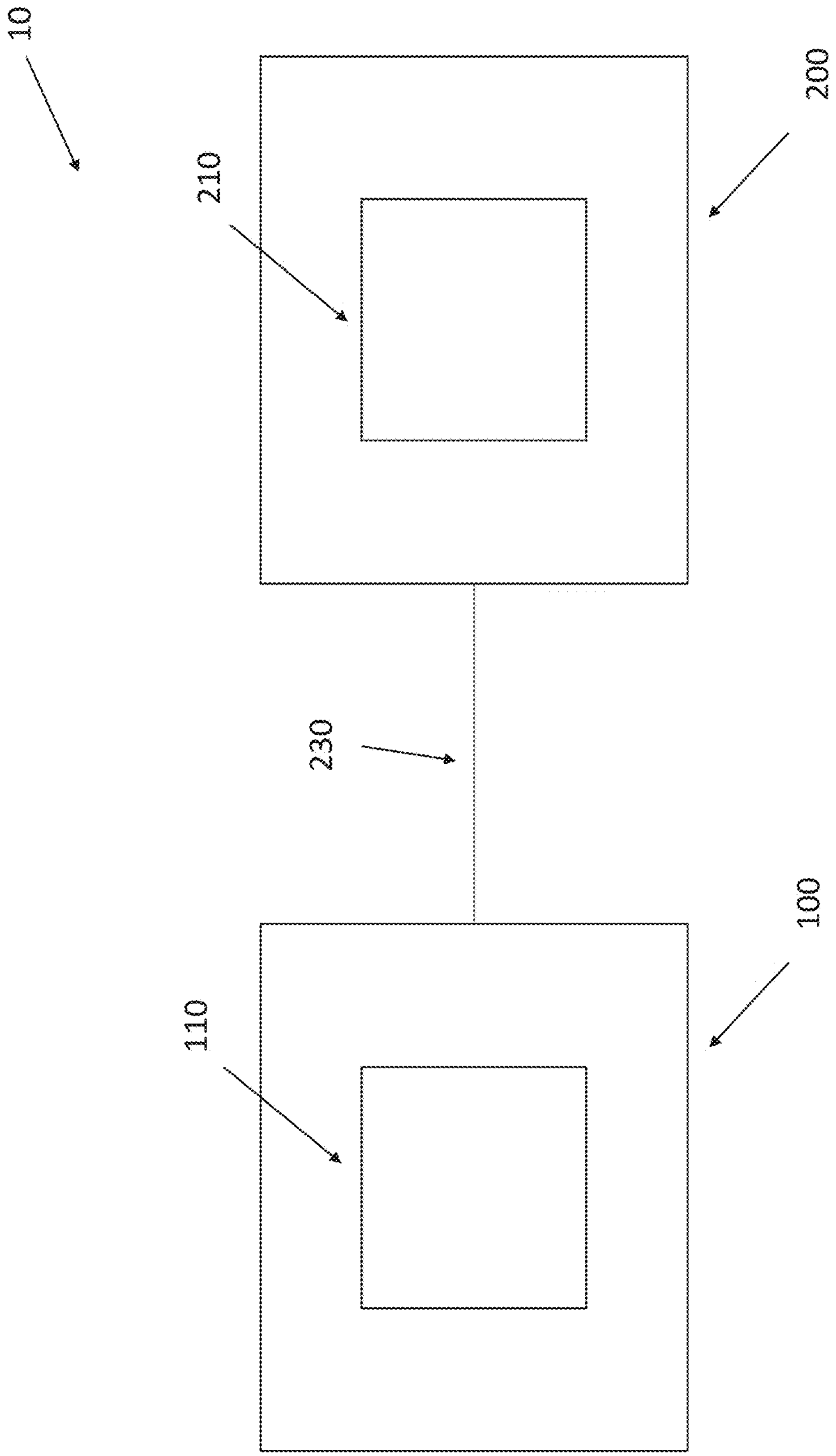
FIG. 1 is a schematic, top perspective view of one embodiment of the system for visualizing anatomical education.
Figure 2:
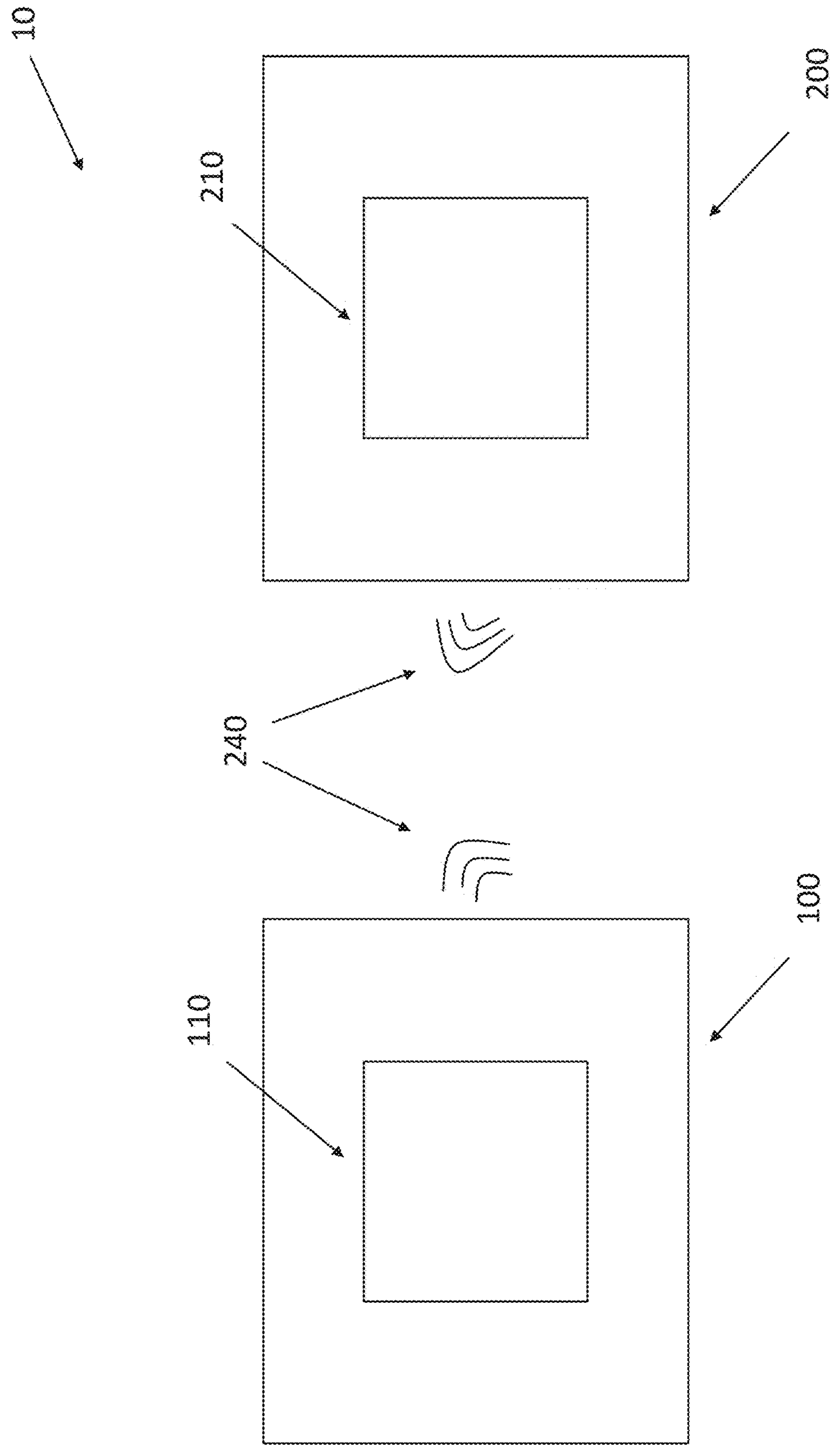
FIG. 2 is a schematic, top perspective view of another embodiment of the system for visualizing anatomical education.
Figure 5:
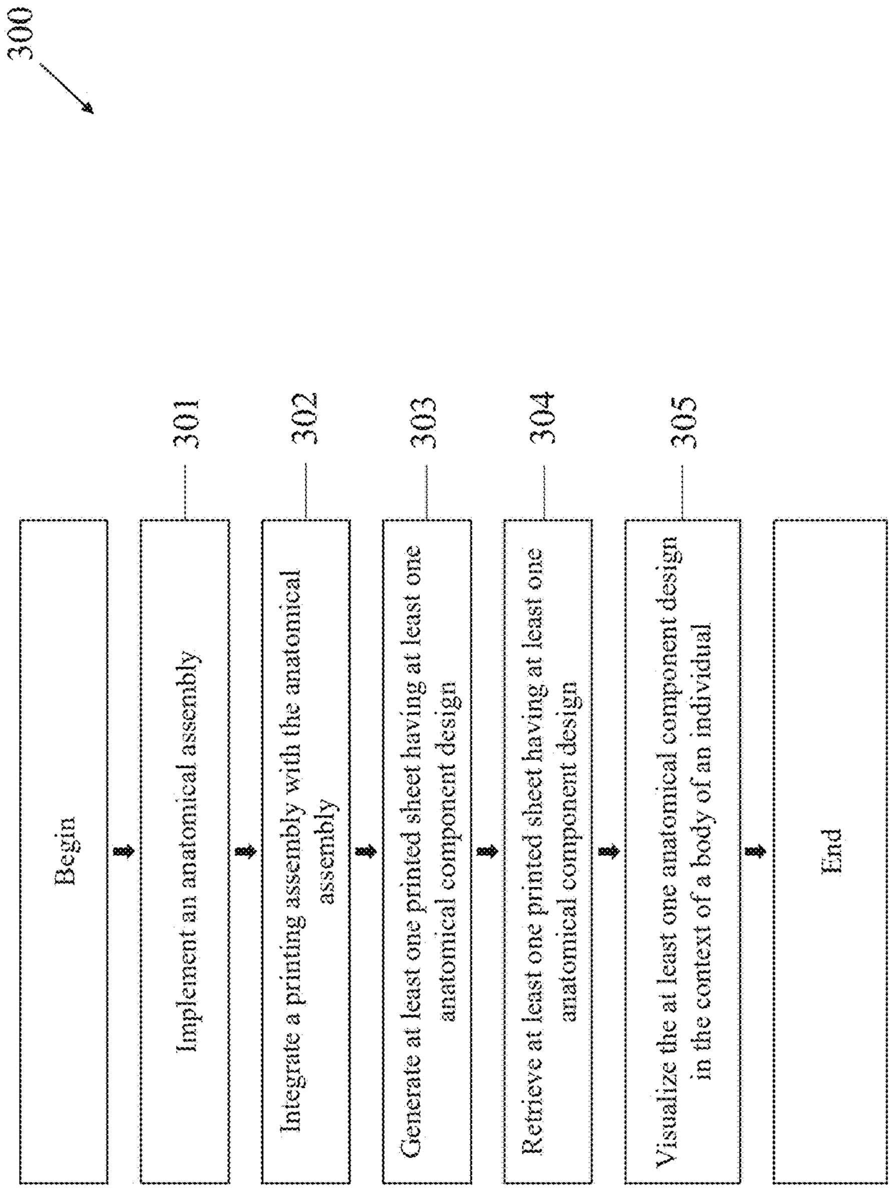
FIG. 5 is a schematic representation in block form representing at least one method embodiment of the present invention.
Figure 9:
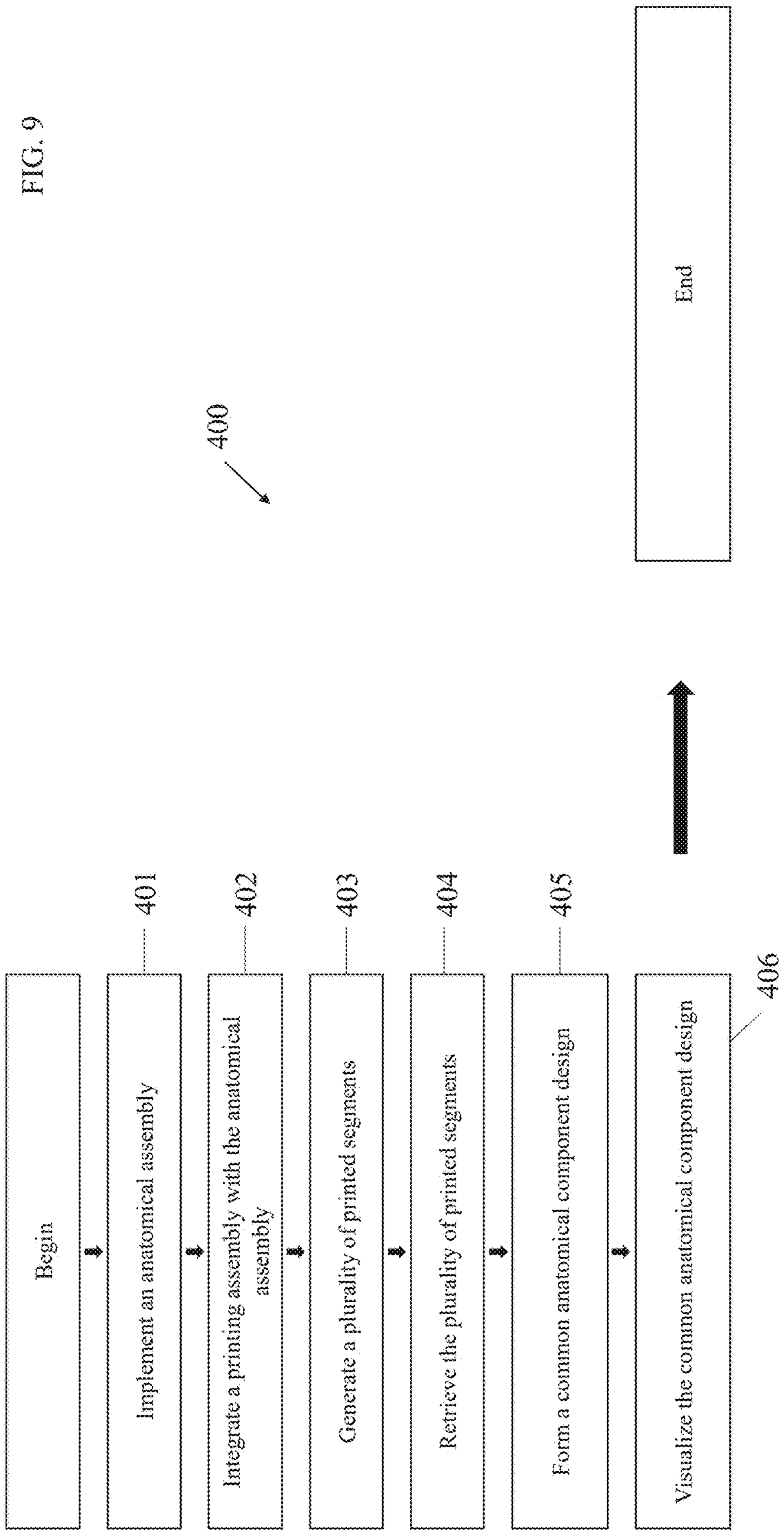
FIG. 9 is a schematic representation in block form representing at least one method embodiment of the present invention.
Figure 11:
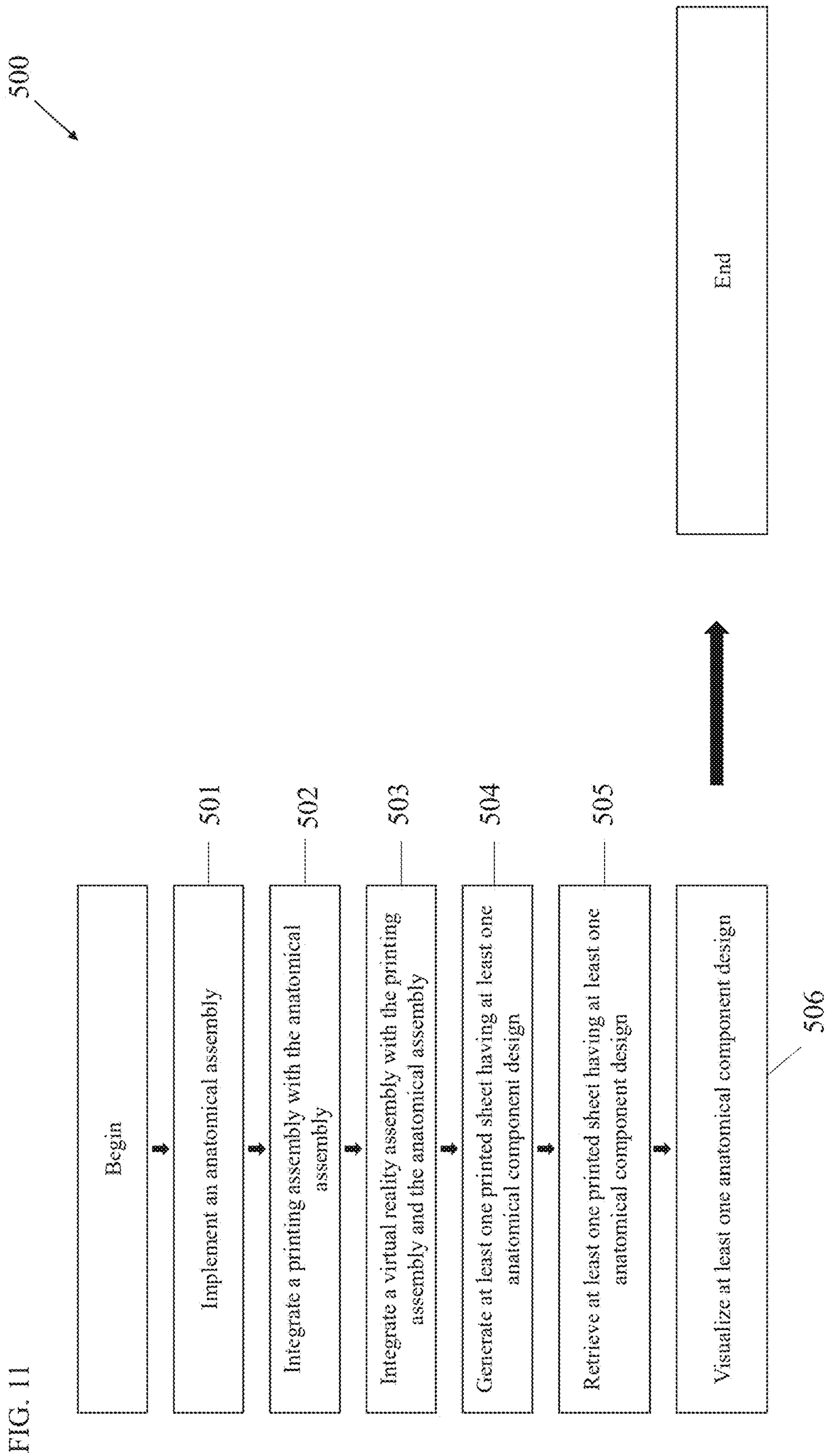
FIG. 11 is a schematic representation in block form representing at least one method embodiment of the present invention.
Figure 12:
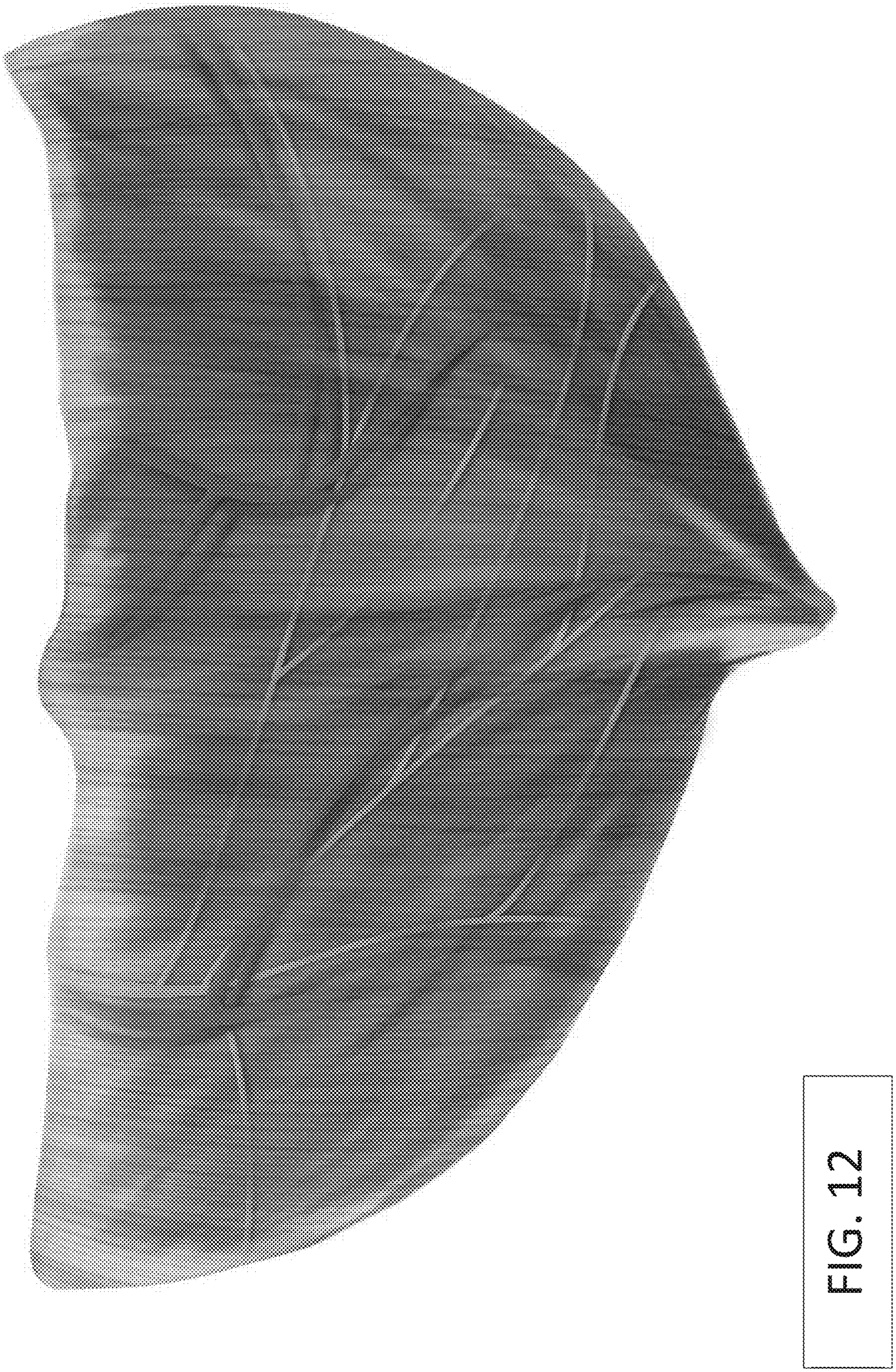
FIG. 12 is a schematic illustration representing at least one embodiment of an anatomical component design.
Figure 13:
FIG. 13 is a schematic illustration representing at least one embodiment of the step of visualizing of the at least one anatomical component design in the context of a body of an individual.

As represented throughout the accompanying figures, the present invention is directed to a system for visualizing anatomical education generally indicated as 10 in at least FIGS. 1-2 and to attendant methods for visualizing anatomical education, generally represented as 300 in FIG. 5, 400 in FIG. 9, and 500 in FIG. 11.

With initial reference to FIGS. 1-2, the system for visualizing anatomical education 10 may comprise an anatomical assembly 100 which may further comprise at least one source of educational information 110 the at least one source of educational information 110 configured to contain at least one anatomical component design. By way of non-limiting example, the at least one anatomical component design may be hand-drawn, graphically designed, or three-dimensionally modeled. By way of additional non-limiting example, the at least one anatomical component design is a design of at least one anatomical component. In such an example, the at least one anatomical component may be a single component—such as a single muscle—or a plurality of components that may or may not be interconnected—such as an amalgamation of muscles. Additionally, in at least some embodiments, the at least one source of educational information 110 is a physical device, such as an external hard drive, SD card, USB flash drive, or other device with processing power and/or a memory component. In at least some other embodiments, the at least one source of educational information is a digital repository, such as a cloud-based storage server or other information system that ingests, stores, manages, preserves, and provides access to the data stored therein.

Figure 3:
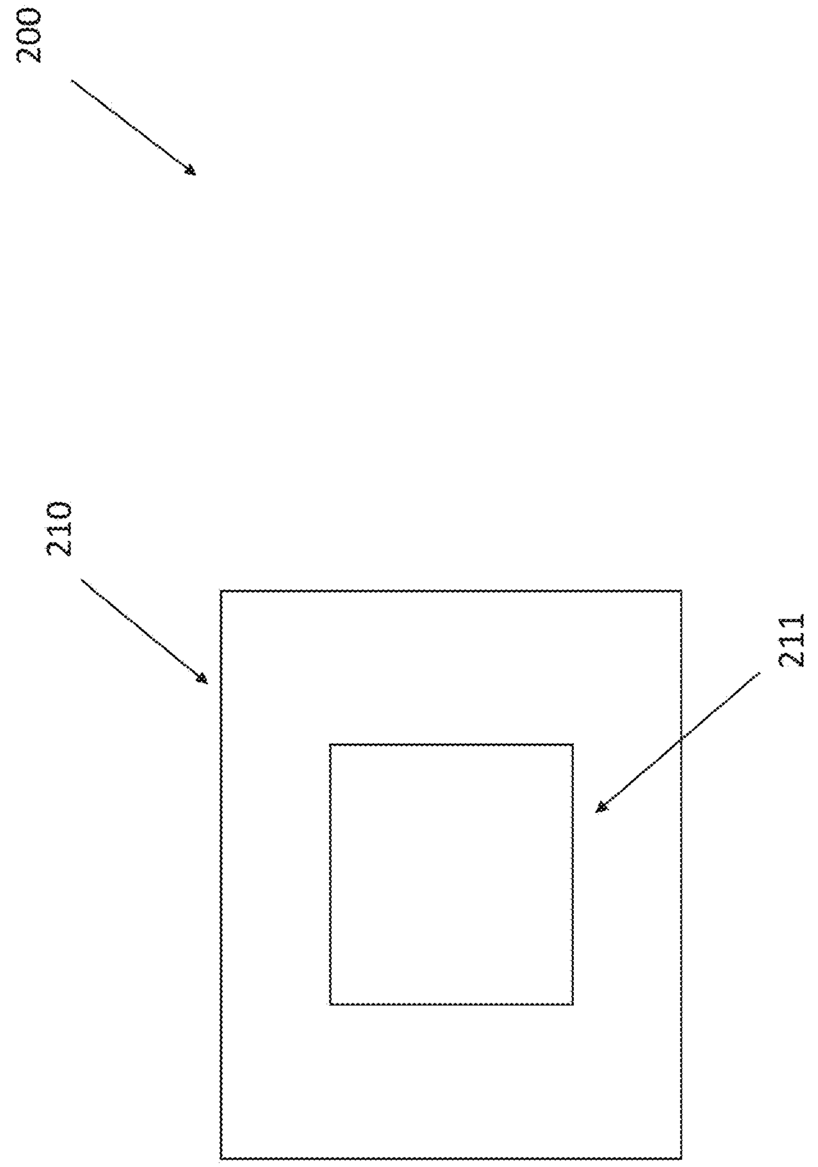
FIG. 3 is a schematic, top perspective view of one embodiment of the printing assembly of the system for visualizing anatomical education.

The system for visualizing anatomical education 10, seen in FIGS. 1-2, may also comprise a printing assembly 200, with the anatomical assembly 100 communicably configured in connection with the printing assembly 200. In at least one embodiment, seen in FIG. 1, the printing assembly 200 is communicably configured in connection with the anatomical assembly 100 via a connecting wire 230. In at least one other embodiment, seen in FIG. 2, the printing assembly 200 is communicably configured in connection with the anatomical assembly 100 via a wireless technology 240, such as Wi-Fi or Bluetooth technology. By way of non-limiting example, as seen in FIG. 3, the printing assembly 200 may comprise at least one printer 210. By way of additional non-limiting example, the printing assembly 200 may comprise at least two printers. In such an embodiment, the at least two printers are communicably configured in connection with one another. Furthermore, by way of non-limiting example, and as seen in FIG. 3, the printing assembly 200 may comprise at least one printer 210 operable with at least one printable sheet 211. In at least some embodiments wherein the printing assembly comprises at least one printable sheet 211, the at least one printable sheet may comprise a transferable print media structurally configured to transfer the at least one anatomical component design onto a visualization surface. In such embodiments, and by way of non-limiting example, the at least one printable sheet comprises at least one water slide paper or silhouette paper. By way of non-limiting example, the at least one printable sheet may be transparent or translucent in nature. By way of another non-limiting example, in such embodiments wherein the at least one printable sheet 211 comprises a transferable print media, the at least one printable sheet may be configured to transfer the at least one anatomical component design onto a visualization surface, such as human skin, akin to a removable tattoo (e.g., a user may transfer the at least one anatomical component design onto the user's own skin or onto the skin of another). In such embodiments, and by way of non-limiting example, the system may also include at least one material configured to remove the at least one anatomical component design from the visualization surface, such as at least one removal wipe. Moreover, and by way of additional non-limiting example, the at least one anatomical component design may comprise at least one scannable area, the at least one scannable area configured such that the scanning of the at least one scannable area provides at least one educational resource pertaining to the at least one anatomical component. In such embodiments, it may be understood that visualization of the anatomical component design may thus take on an interactive medium, wherein a user is able to visualize the anatomical component design in the context of the user's body, without the need for a cadaver. Furthermore, in at least one of such embodiments, the at least one printable sheet 211 may be configured to transfer the at least one anatomical component design onto a visualization surface by way of layering at least one anatomical component design layer on top of or in anatomical relation to at least one other anatomical component design layer, such that the removal of the outermost anatomical component design layer may serve to further visualize anatomical information relating to the at least one anatomical component. By way of additional non-limiting example, the at least one anatomical component design layer is transparent or translucent in nature such that at least one other anatomical component design layer is visible when layered.

Figure 4:
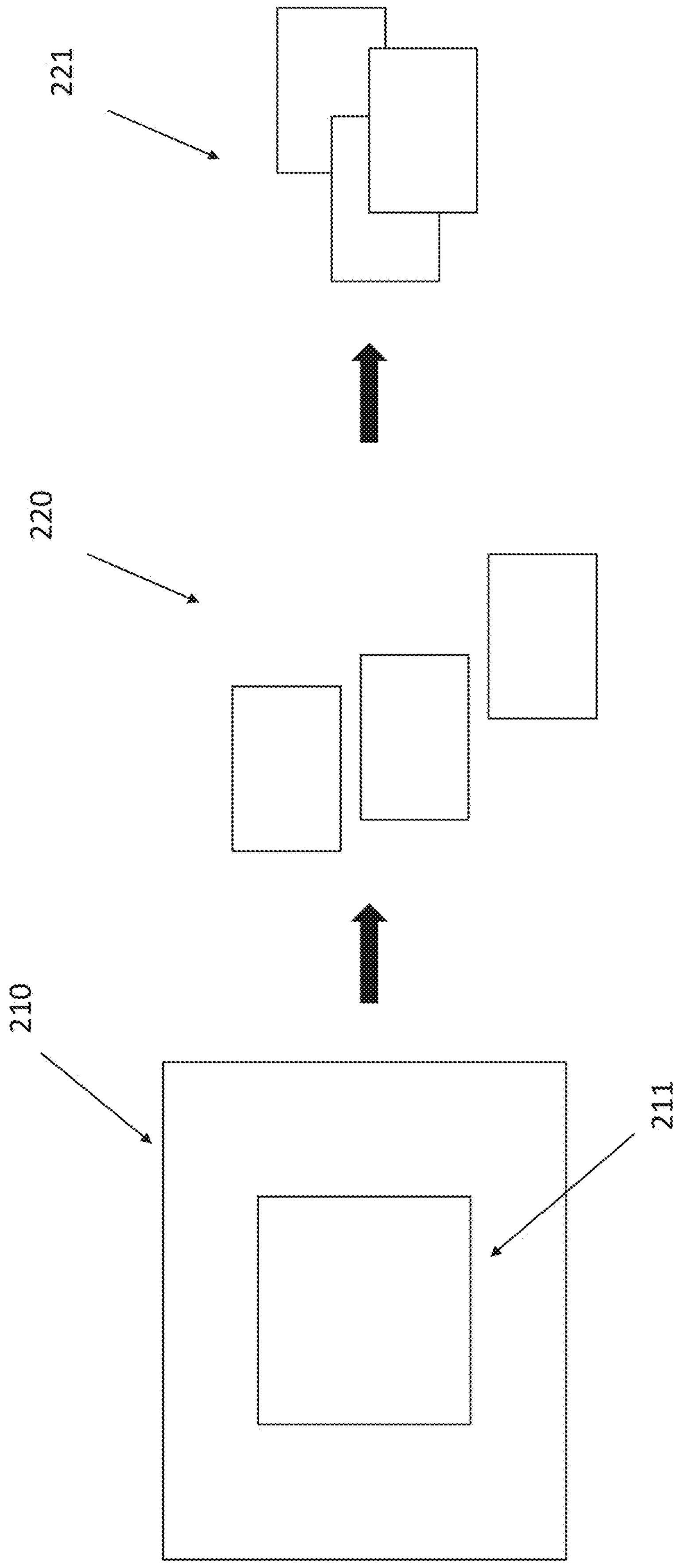
FIG. 4 is a flow chart representation involving the printing assembly of one embodiment of the system for visualizing anatomical education.

Moreover, in some embodiments of the present invention, seen in FIGS. 1-3, the printing assembly 200 is operatively configured to print the at least one anatomical component design in at least one size. In at least one other embodiment of the present invention, the printing assembly is operatively configured to print the at least one anatomical component design in sizes corresponding to the actual sizes of the at least one anatomical component. In at least some other embodiments, seen in FIG. 4, the printing assembly 200 is operatively configured to print the at least one anatomical component design in a plurality of printed segments 220. In such embodiments, also seen in FIG. 4, the plurality of printed segments 220 may be structurally configured to collectively form a common anatomical component design 221. In at least some other embodiments, the printing assembly is operatively configured to generate a visual representation of the at least one anatomical component design on a transferable print media, the visual representation having a predetermined size. In such embodiments, the transferable print media is configured to transfer the at least one anatomical component design onto a visualization surface.

Figure 6:
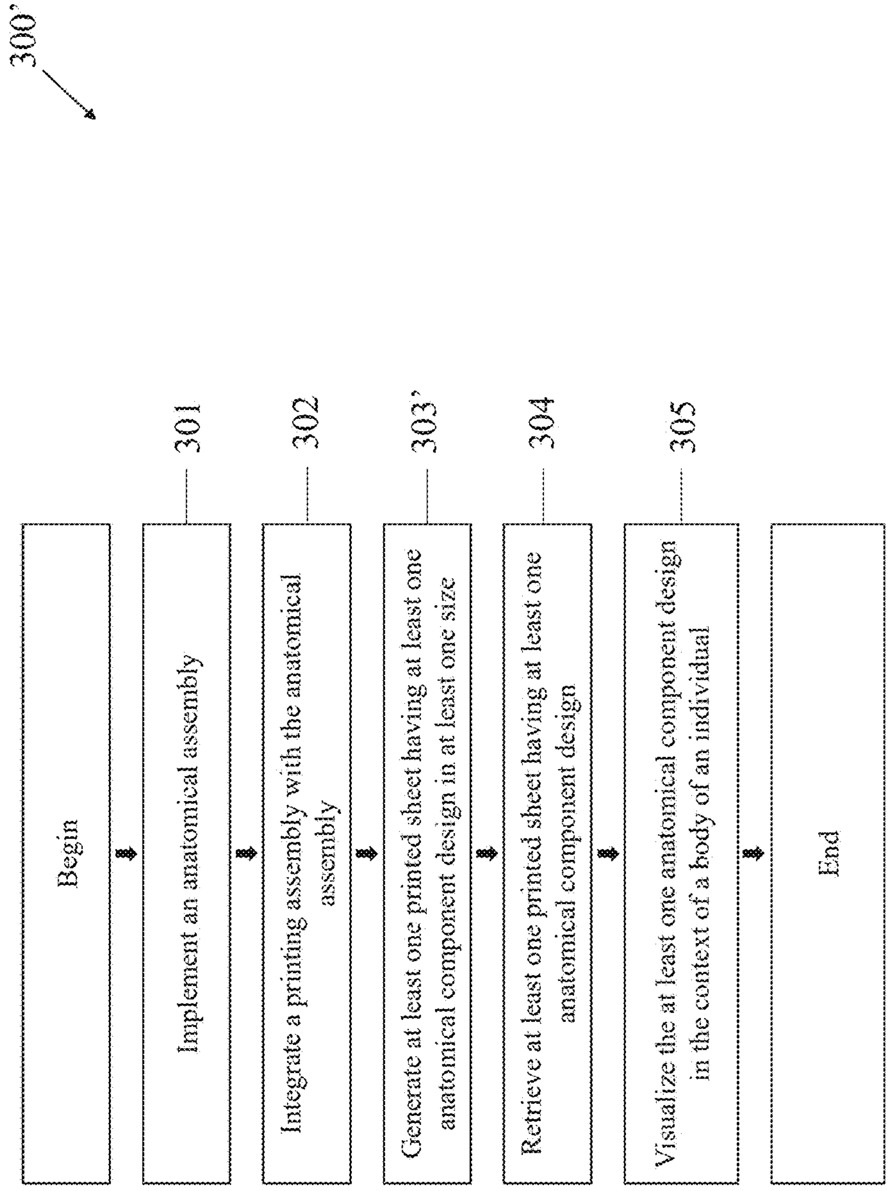
FIG. 6 is a schematic representation in block form representing at least one method embodiment of the present invention.
Figure 7:
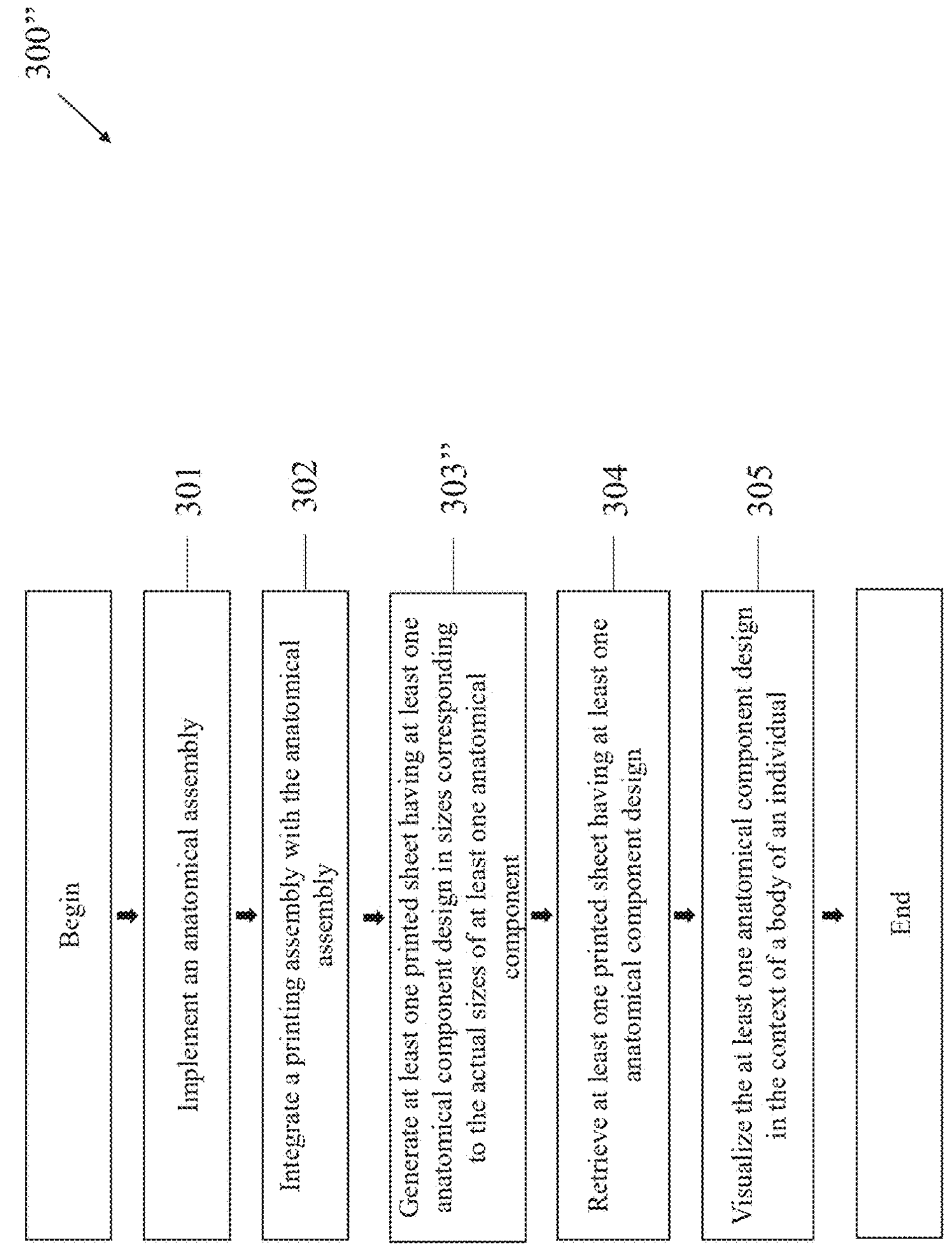
FIG. 7 is a schematic representation in block form representing at least one method embodiment of the present invention.
Figure 8:
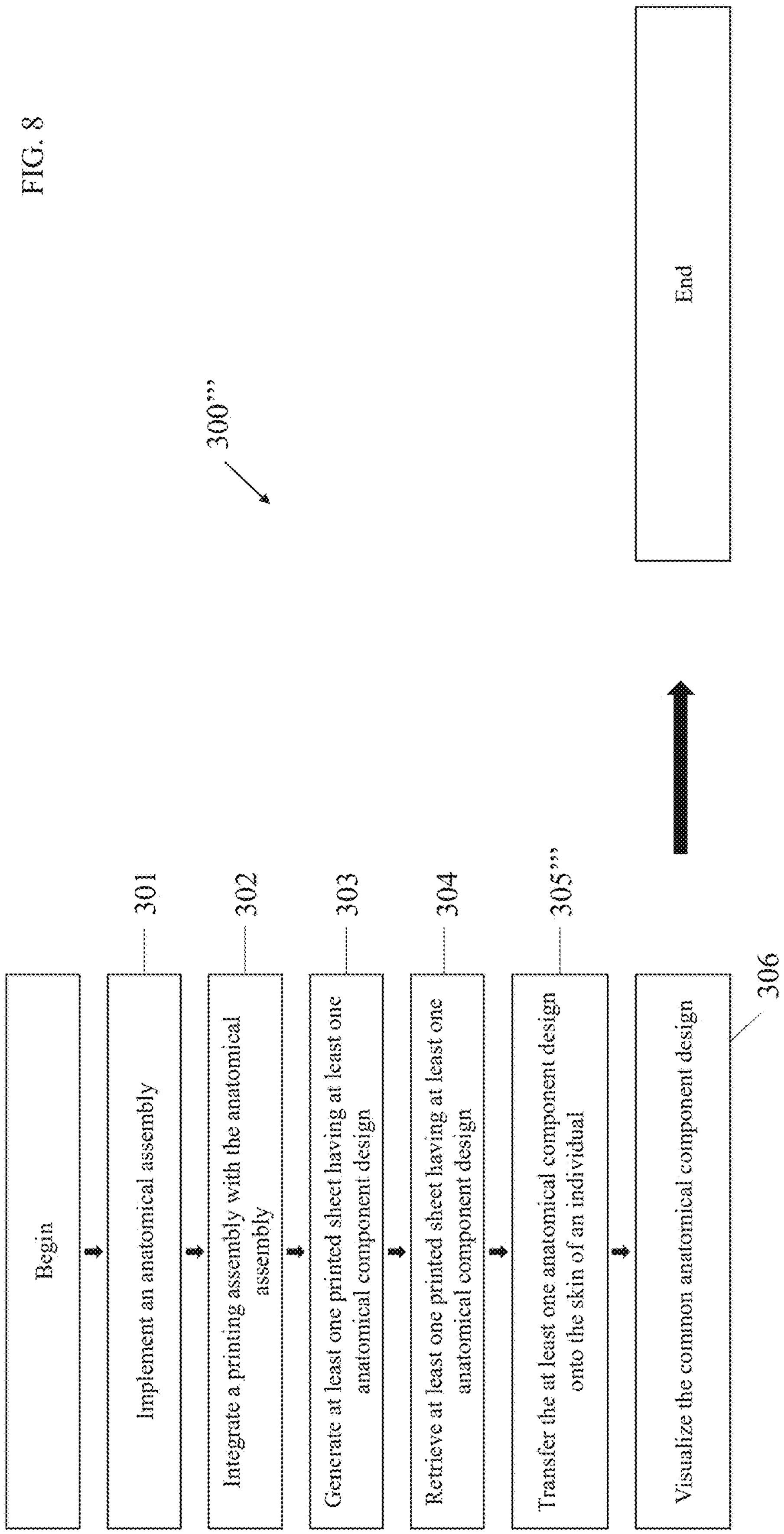
FIG. 8 is a schematic representation in block form representing at least one method embodiment of the present invention.

FIG. 5 represents one embodiment of the method 300 of the present invention attendant to the system for visualizing anatomical education 10, as represented in FIGS. 1-2. More specifically, one of the attendant methods 300, seen in FIG. 5, of the present invention includes the visualization of anatomical education. Further, as seen in FIG. 5, one or more embodiments of the present invention include a method 300 comprising the implementing of an anatomical assembly 301 having at least one source of educational information, the integrating of a printing assembly with the anatomical assembly 302, the generating of at least one printed sheet having at least one anatomical component design 303, and the visualizing of the at least one anatomical component design in the context of a body of an individual 305. Involved in the method of such embodiments of the present invention, also seen in FIG. 5, is the retrieving of the at least one printed sheet having at least one anatomical component design 304. In some embodiments of the present invention, seen in FIG. 6, the method 300' of the present invention includes the generating of the at least one printed sheet having at least one anatomical component design in at least one size 303'. In other embodiments of the present invention, seen in FIG. 7, the method 300" of the present invention includes the generating of at the least one printed sheet having at least one anatomical component design in sizes corresponding to the actual sizes of at least one anatomical component 303". In additional embodiments still, seen in FIG. 8, the method of the present invention 300'" includes the transferring of the at least one anatomical component design onto the skin of an individual 305'". In such embodiments, the at least one printed sheet comprises a transferable print media. Furthermore, in at least one other embodiment, the method of the present invention includes the transferring of the at least one anatomical component design onto a visualization surface, such as the skin of an individual, by way of layering at least one anatomical component design layer on top of or in anatomical relation to at least one other anatomical component design layer, such that the removal of the outermost anatomical component design layer may serve to further visualize anatomical information relating to the at least one anatomical component.

Figure 10:
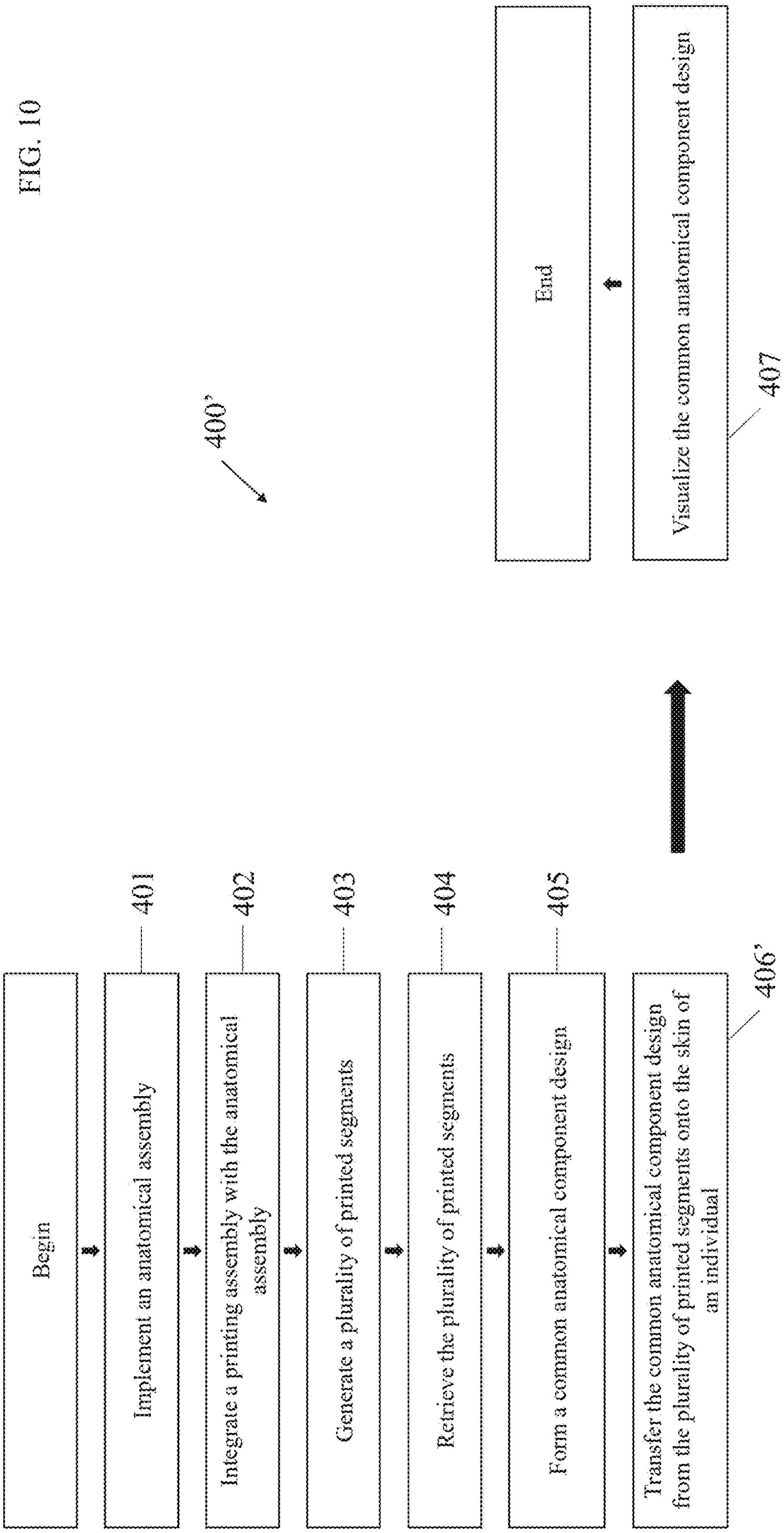
FIG. 10 is a schematic representation in block form representing at least one method embodiment of the present invention.

By way of non-limiting example, and as seen in FIG. 9, the method 400 of the present invention in one or more preferred embodiments further includes the generating of the at least one printed sheet having at least one anatomical component design in a plurality of printed segments 403, the retrieving of the plurality of printed segments 404, the forming of a common anatomical component design 405, and the visualizing of the common anatomical component design 406. In at least one other embodiment, seen in FIG. 10, the method of the present invention 400' further includes the transferring of the common anatomical component design from the plurality of printed segments onto the skin of an individual 406'.

Furthermore, and by way of non-limiting example, the method 500 for visualizing anatomical education, seen in FIG. 11, may comprise the implementing of an anatomical assembly 501 having at least one source of educational information; the integrating of a printing assembly with the anatomical assembly 502; the integrating of a virtual reality assembly with the printing assembly and the anatomical assembly 503, the virtual reality assembly configured to visualize the at least one anatomical component design; the generating of at least one printed sheet having at least one anatomical component design 504, and the visualizing of the at least one anatomical component design 506. Involved in the method of such embodiments of the present invention is the retrieving of the at least one printed sheet having at least one anatomical component design 505.

Since many modifications, variations and changes in detail can be made to the described embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A system for visualizing anatomical education comprising:

an anatomical assembly comprising at least one source of educational information, said at least one source of educational information configured to contain at least one anatomical component design;

said anatomical assembly communicably configured in connection with a printing assembly, said printing assembly comprises at least one printer, said at least one printer operable with at least one printable sheet, said at least one printable sheet comprises a transferable print media structurally configured to transfer the at least one anatomical component design onto a visualization surface, and said printing assembly operatively configured to print the at least one anatomical component design in at least one size.

2. The system of claim 1, wherein said printing assembly is operatively configured to print the at least one anatomical component design in a plurality of printed segments, the plurality of printed segments structurally configured to collectively form a common anatomical component design.

3. The system of claim 1, wherein said printing assembly is operatively configured to print the at least one anatomical component design in sizes corresponding to the actual sizes of the at least one anatomical component.

4. The system of claim 1, wherein said at least one printable sheet comprises at least one water slide paper or silhouette paper.

5. The system of claim 1, wherein said visualization surface is the skin of an individual.

6. A method for visualizing anatomical education comprising:

implementing an anatomical assembly having at least one source of educational information, integrating a printing assembly with the anatomical assembly, generating at least one printed sheet comprising a transferable print media, the at least one printed sheet having at least one anatomical component design, and visualizing the at least one anatomical component design in the context of a body of an individual.

7. The method as recited in claim 6, comprising generating the at least one printed sheet having at least one anatomical component design in at least one size.

8. The method as recited in claim 6, comprising generating the at least one printed sheet having at least one anatomical component design in sizes corresponding to the actual sizes of the at least one anatomical component.

9. The method as recited in claim 6, comprising transferring the at least one anatomical component design from the transferable print media onto the skin of an individual.

10. The method as recited in claim 6, comprising generating the at least one printed sheet having at least one anatomical component design in a plurality of printed segments, the plurality of printed segments structurally configured to collectively form a common anatomical component design.

11. The method as recited in claim 10, comprising forming each of the plurality of printed segments from a transferable print media, the plurality of printed segments configured to collectively form a common anatomical component design.

12. The method as recited in claim 11, comprising transferring the common anatomical component design from the plurality of printed segments onto the skin of an individual.

13. A system for visualizing anatomical education comprising:

an anatomical assembly comprising at least one source of educational information, said at least one source of educational information configured to contain at least one anatomical component design, said anatomical assembly communicably configured in connection with a printing assembly, said printing assembly operative to generate a visual representation of said at least one anatomical component design on a printable sheet, said printable sheet comprising transferable print media, said visual representation having a predetermined size, said predetermined size corresponding to the actual size of the at least one anatomical component, said transferable print media configured to transfer the at least one anatomical component design onto a visualization surface.

14. The system of claim 13, wherein said visualization surface is the skin of an individual.

15. The system of claim 13, wherein said printing assembly is operatively configured to print the at least one anatomical component design in a plurality of printed segments, the plurality of printed segments structurally configured to collectively form a common anatomical component design.

16. A method for visualizing anatomical education comprising:

implementing an anatomical assembly having at least one source of educational information, integrating a printing assembly with the anatomical assembly, integrating a virtual reality assembly with the printing assembly and the anatomical assembly, the virtual reality assembly configured to visualize at least one anatomical component design, generating at least one printed sheet having the at least one anatomical component design, and visualizing the at least one anatomical component design.

* * * * *